United States Patent [19]

Diekhaus et al.

[11] Patent Number: 6,083,470
[45] Date of Patent: Jul. 4, 2000

[54] PROCESS FOR REMOVING ORGANIC PHOSPHOROUS COMPOUNDS AND OTHER IMPURITIES FROM DILUTE SULFURIC ACID

[75] Inventors: Gerhard Diekhaus; Harald Kappesser, both of Oberhausen, Germany

[73] Assignee: Hoechst Aktiengesellschaft, Germany

[21] Appl. No.: 08/227,576

[22] Filed: Apr. 14, 1994

Related U.S. Application Data

[63] Continuation of application No. 07/975,706, Nov. 13, 1992, abandoned.

[30] Foreign Application Priority Data

Dec. 2, 1991 [DE] Germany .............................. 41 39 651

[51] Int. Cl.⁷ .................................................... C01B 17/90
[52] U.S. Cl. ........................... 423/531; 423/522; 423/529
[58] Field of Search ..................................... 423/522, 531, 423/529, DIG. 1, DIG. 2

[56] References Cited

U.S. PATENT DOCUMENTS

| 2,766,275 | 10/1956 | Connelly et al. ........................ 260/504 |
| 3,992,247 | 11/1976 | Bodenbenner et al. ............... 159/47 R |

FOREIGN PATENT DOCUMENTS

| 41134 | 12/1981 | European Pat. Off. ...... C07C 139/14 |
| 61193 | 9/1982 | European Pat. Off. ........ C01B 17/90 |
| 175919 | 4/1986 | European Pat. Off. .......... C07F 9/50 |
| 3235030 | 3/1984 | Germany .......................... C07F 9/50 |
| 514769 | 5/1976 | U.S.S.R. ................................. 423/527 |
| 611877 | 6/1978 | U.S.S.R. ................................. 423/522 |

*Primary Examiner*—Steven P. Griffin
*Assistant Examiner*—Timothy C Vanoy
*Attorney, Agent, or Firm*—Bierman, Muserlian and Lucas

[57] ABSTRACT

Sulfuric acid which contains dilute organic phosphorus compounds and other impurities and is obtained, for example, during preparation of sulfonated arylphosphines, is purified by extraction with an amine which is sparingly soluble or insoluble in water.

27 Claims, No Drawings

PROCESS FOR REMOVING ORGANIC PHOSPHOROUS COMPOUNDS AND OTHER IMPURITIES FROM DILUTE SULFURIC ACID

This application is a continuation of application Ser. No. 07/975,706 filed Nov. 13, 1992 now abandoned.

This Application claims the priority of German Application P 41 39 651.0, filed Dec. 2, 1991.

The invention relates to a process for the purification of sulfuric acid which is formed, for example, as a waste product during preparation of sulfonated arylphosphines and contains organic phosphorus compounds and other impurities.

BACKGROUND OF THE INVENTION

Triarylphosphines having sulfonated aryl radicals are widely used as catalysts in the chemical industry, especially when dissolved in water together with rhodium compounds. They are successfully employed, inter alia. for hydroformylation of olefins (cf. DE 26 27 354 B1), cyclic amines are added onto conjugated dienes in their presence (cf. EP 176 398 A1), and they are used as catalysts for hydrogenation of organic compounds.

According to the teaching of DE 32 35 030 A1, sulfonated triarylphosphines are prepared starting from triarylphosphines, which are reacted with oleum at 0° to 40° C. When the reaction is complete, the reaction mixture is diluted with water, and the sulfonated triarylphosphine is extracted with a water-insoluble amine, dissolved in a water-insoluble organic solvent. The organic and the aqueous phases are separated from one another, and the sulfonated triarylphosphine is obtained from the organic phase, for example by treatment with an aqueous solution of an inorganic base. The aqueous phase essentially comprises dilute sulfuric acid (also called waste acid) having an acid content of 25% to 35% by weight. It is contaminated by water-soluble phosphorus compounds and other substances, which account for the COD (Chemical Oxygen Demand) value of about 5 to 25 g/l.

The COD value is a measure of the degree of contamination of waste waters. It is the amount of potassium dichromate, expressed as oxygen equivalents, consumed by the oxidizable contents of one liter of water. The COD value is determined by a standardized procedure which is described, for example, in Ullmanns Encyclopadie der Technischen Chemie (Ullman's Encyclopedia of Industrial Chemistry), 4th Edition (1981), Volume 6, pages 376 et sea. Water-soluble organic phosphorus compounds are to be understood as being sulfonated triarylphosphines, as well as secondary and degradation products thereof. If the sulfonated triarylphosphine is, for example, the sulfonation product of triphenylphosphine, the waste acid contains, inter alia, the phosphines

| tri(m-sulfophenyl)phosphine | (TPPTS) |
| di(m-sulfophenyl)phenylphosphine | (TPPDS) |
| di(phenyl)(m-sulfophenyl)phosphine | (TPPMS) |
| the phosphine oxides formed by oxidation | |
| tri(m-sulfophenyl)phosphine oxide | (TPPOTS) |
| di(m-sulfophenyl)phenylphosphine oxide | (TPPODS) | and, in small amounts, the phosphine sulfides formed by reduction.

| tri(m-sulfophenyl)phosphine sulfide | (TPPSTS) |
| di(m-sulfophenyl)phenylphosphine sulfide | (TPPSDS). |

For economic reasons, endeavors are made to employ the waste acid in chemical processes directly rather than indirectly, i.e. by concentration, cleavage to give $SO_2$, followed by catalytic oxidation of the sulfur dioxide. A precondition of this process is the elimination of the impurities dissolved in the waste acid.

It is known from EP 41 134 A2 that water-soluble salts of aromatic sulfonic acids can be separated from sulfonation mixtures with the aid of water-insoluble amines. For this purpose, the sulfonation mixture is diluted with water and then mixed with a solvent-free amine in an amount equivalent to the sulfonic acid. The sulfonic acid forms a lipophilic ammonium salt, which separates spontaneously from the aqueous phase. A precondition of this preparative process is that the sulfonation mixture is essentially free from unsulfonated starting material and other neutral substances. Waste products of chemical processes in general do not meet this requirement, since formation of small amounts of neutral substances by secondary and subsequent reactions cannot be prevented. Moreover, purification operations are not based on preparative processes, rather they are described as analytical processes in which even substances which are present in only trace amounts must be detected and separated out.

SUMMARY OF THE INVENTION

It is, therefore, the object of the invention to provide a reliable procedure which enables sulfonated organic phosphorus compounds and other impurities to be removed from dilute sulfuric acid. This procedure should be of broad application, should be economical, and should yield very pure sulfuric acid.

The present invention achieves this by extracting the dilute sulfuric acid with 40 to 90 mol, per mol of the sulfonic acid radicals ($-SO_3H$) dissolved in the acid, of an amine which is sparingly soluble or insoluble in water. Surprisingly, by the inventive process, it is possible to free even heavily contaminated sulfuric acid from foreign substances contained in it to the extent that its quality corresponds to that of sulfuric acid which has not yet been used. The selectivity achieved in the purification process, in spite of the use of a large excess of amine, based on the sulfonic acid radicals dissolved as compounds in the sulfuric acid, is particularly unexpected. By extraction with a water-soluble amine, the impurities, in particular the organic phosphorus compounds containing sulfonic acid radicals, are selectively removed, while the sulfuric acid reacts with the amine to only a minor extent. It is thus ensured that the sulfuric acid is recovered in a very high yield.

DETAILED DESCRIPTION OF THE INVENTION

Dilute sulfuric acid which originates from sulfonation of arylphosphines is employed as the starting substance in the process according to the invention. As already mentioned, after removal of the sulfonated arylphosphine, the sulfuric acid remains in dilute form and is contaminated by residues of the reaction product, by-products, and other organic substances of unknown composition.

The concentration of the sulfuric acid is between 25% and 35% by weight, and the concentration of the phosphorus compounds (the most important impurities), is between 150 and 600 ppm by weight, (calculated as P). The ranges mentioned are only guidelines, and the actual values may be either above or below these. They depend, in particular, on the procedure for the sulfonation and the removal of the reaction product from the reaction mixture.

According to the invention, the impurities contained in the sulfuric acid are extracted with the aid of an amine which is sparingly soluble or insoluble in water. The amount of amine required depends on the amount of sulfonic acid radicals present in the solution. The amount must be determined analytically, for example by high pressure liquid chromatography (HPLC). 40 to 90 mol of the amine are used per mol of sulfonic acid radicals contained in dissolved form in the sulfuric acid, and 60 to 80 mol of amine are preferably employed.

Useful amines which are sparingly soluble or insoluble in water include acyclic or cyclic aliphatic, aromatic, araliphatic, and heterocyclic primary, secondary, and tertiary amines, preferably secondary or tertiary amines. Acyclic, branched or unbranched aliphatic amines having a total of 10 to 60, in particular 13 to 36, carbon atoms are preferred. Examples of such compounds are tri-n-hexylamine, tri-n-octylamine, tri-isooctylamine (in the form of the isomer mixture), di-2-ethylhexlamine, triisononylamine (in the form of the isomer mixture), isotridecylamine (in the form of the isomer mixture), diisononyl-2-phenylpropylamine, isononyl-di-2-phenylpropylamine, tri-isotridecylamine (in the form of the isomer mixture), N,N-dimethyl-hexadecylamine, and N,N-dimethyloctadecylamine. Isotridecylamine, tri-n-octylamine, and tri-isooctylamine have proved to be particularly suitable extraction agents.

The amines are employed for the extraction as a solution in an organic solvent which is immiscible or only slightly miscible with water. The concentration of the amine in the solution can extend over a wide range. It is essentially limited by the solubility of the amine salts in the solvent and by the viscosity of the salt solution obtained. The solutions accordingly usually contain 10% to 50%, preferably 15% to 35% by weight of amine, based on the solution.

For selection of the solvent, its physical properties are predominantly determinative. Low solubility in water, low evaporation rate, and little or no tendency to form emulsions are desirable. The solvent should, moreover, be inert, non-toxic, inexpensive, have good hydrodynamic properties, and also have a good capacity for extraction of other impurities dissolved in the waste waters. Suitable solvents include kerosene-like fractions, aromatic fractions, $C_4$–$C_{20}$ alcohols, and $C_8$–$C_{20}$ ethers. Kerosene-like fractions, i.e. hydrocarbons having boiling points of between 175° and 325° C., and toluene are preferred. The extraction is as a rule carried out at normal temperature under normal pressure, but conditions which deviate from these, for example increased pressure, are not excluded.

Further processing of the organic phase for conversion of the impurities into a concentrated aqueous solution and for regeneration of the amine can be carried out in various ways. Thus, it has proved appropriate to reextract the amine phase with an aqueous solution of an inorganic base. Suitable compounds are the hydroxides of alkali metals and alkaline earth metals, in particular sodium hydroxide, as well as the alkali metal carbonates. The base is employed as a 5% to 30% by weight solution, and is preferably used in stoichiometric amounts, based on the amine or, if appropriate, in excess of up to 20%. A larger excess of base adds another undesirable solution constituent to the aqueous solution containing the impurities in concentrated form, and should therefore be avoided. Another successfully used process for working up the amine phase is treatment thereof with steam. For this purpose, steam under at least 1.8 MPa is passed into the amine solution. In this procedure, rhodium and the impurities pass into the aqueous phase, which is separated from the amine phase, for example, by decanting.

The amine recovered after the treatment with a base or steam can be employed again, together with the solvent used, for purification of contaminated sulfuric acid by the process according to the invention. From time to time it can be purified, for example by distillation, as can the solvent, if necessary.

The process according to the invention is carried out batchwise or, preferably, continuously, using the apparatus customary for extractive substance separations, such as extraction columns and mixer/settlers. It can be carried out in one or more stages. The purified acid can be employed in chemical processes, for example for preparation of fertilizers, directly or after concentration.

The following examples describe the invention, but do not limit it.

EXAMPLES

Waste sulfuric acid, the concentration and phosphorus content of which is shown in the following Table, is employed in the examples.

Sulfuric acid and a solution of 20% by weight (based on the solution) of tri-isooctylamine in toluene as the extraction agent are added successively to a reactor with stirring. Stirring is continued at room temperature for 30 minutes, and the two phases which are formed are then separated. The purified sulfuric acid can be employed directly in chemical processes. The amine solution is reextracted by stirring with aqueous NaOH solution for 30 minutes. The aqueous phase obtained after separation of the phases comprises the impurities removed from the sulfuric acid in concentrated solution. The amine/toluene solution can be employed again as the extraction agent.

The extraction conditions and the results of the sulfuric acid purification are likewise summarized in the Table. Examples 1 to 5 describe the process of the invention, and Examples 6 and 7, which are comparison examples, are carried out under conditions which lie outside the novel procedure.

TABLE

| | Waste acid | | | | Purified acid | | |
|---|---|---|---|---|---|---|---|
| Example | $H_2SO_4$ concentration (% by weight) | P concentration (ppm by weight) | Ratio of TiOA/RSO$_3$H*) (mol/mol) | $H_2SO_4$ yield (%) | $H_2SO_4$ concentration (% by weight) | P concentration (ppm by weight) | COD (mg/l) |
| 1 | 29.70 | 227 | 68.29 | 61.78 | 21.70 | 2.8 | 384 |
| 2 | 29.60 | 258 | 40.16 | 88.23 | 27.40 | 33.7 | 263 |
| 3 | 29.40 | 263 | 80.00 | 70.77 | 23.70 | 5.2 | 363 |
| 4 | 29.30 | 258 | 62.71 | 71.20 | 23.00 | 11.0 | 263 |
| 5 | 29.60 | 266 | 59.87 | 82.57 | 25.80 | 14.8 | 845 |

TABLE-continued

| | Waste acid | | | Purified acid | | | |
|---|---|---|---|---|---|---|---|
| Example | $H_2SO_4$ concentration (% by weight) | P concentration (ppm by weight) | Ratio of TiOA/$RSO_3H$* (mol/mol) | $H_2SO_4$ yield (%) | $H_2SO_4$ concentration (% by weight) | P concentration (ppm by weight) | COD (mg/l) |
| 6 (comparison) | 32.60 | 441 | 10.62 | 88.65 | 30.50 | 81.0 | |
| 7 (comparison) | 33.12 | 422 | 12.88 | 83.18 | 28.53 | 55.0 | |

*)tri-isooctylamine/sulfonate

While only a limited number of specific embodiments of the present invention have been expressly disclosed, it is, nonetheless, to be broadly construed, and not to be limited except by the character of the claims appended hereto.

What we claim is:

1. A process for removal of sulfonated and unsulfonated organic phosphorus compounds from a starting solution which is a reaction product of sulfonation of aryl phosphines by sulfuric acid, which process comprises extraction of said sulfuric acid with 40 to 90 mol, per mol of the sulfonic acid radicals of said sulfonated organic phosphorus compounds contained in dissolved form in said acid, of a principal amine which is sparingly soluble or insoluble in water.

2. The process of claim 1 wherein said extraction is carried out with 60 to 80 mol, per mol of said sulfonic acid radicals, of said principal amine.

3. The process of claim 1 wherein said principal amine is a branched or unbranched, secondary or tertiary, aliphatic amine having a total of 10 to 60 carbon atoms.

4. The process of claim 3 wherein said aliphatic amine has 13 to 36 carbon atoms.

5. The process of claim 4 wherein said aliphatic amine is tri-iso-octyl amine.

6. The process of claim 1 wherein said principal amine is dissolved in an organic solvent which is immiscible or slightly miscible with water to form an amine solution.

7. The process of claim 6 wherein there is 10% to 50% by weight, based on said amine solution, of said principal amine in said solvent.

8. The process of claim 7 wherein there is 15% to 35% by weight, based on said amine solution, of said principal amine in said solvent.

9. The process of claim 6 wherein said solvent is toluene or hydrocarbon fraction boiling at 175° C. to 325° C.

10. The process of claim 6 wherein said organic solvent is selected from the group consisting of kerosene-like fractions boiling at 175° to 325° C., alcohols having 4 to 20 carbon atoms, ethers having 8 to 20 carbon atoms, and aromatic fractions from petroleum.

11. The process of claim 10 wherein said amine solvent is toluene or said kerosene-like fraction.

12. The process of claim 6 wherein said amine solution is extracted with an aqueous solution of an inorganic base after said extraction of said sulfuric acid.

13. The process of claim 12 wherein said base is selected from the group consisting of alkali metal hydroxides, alkaline earth metal hydroxides, and mixtures thereof.

14. The process of claim 13 wherein said base is sodium hydroxide.

15. The process of claim 12 wherein said aqueous solution contains 5% to 30% by weight of said inorganic base.

16. The process of claim 12 wherein said aqueous solution contains at least a stoichiometric amount of said inorganic base based on said amine.

17. The process of claim 16 wherein said aqueous solution contains an excess of up to 20% over said stoichiometric amount.

18. The process of claim 6 wherein said amine solution is treated with steam after said extraction of said sulfuric acid to decompose impurities present.

19. The process of claim 18 wherein said steam is at a pressure of at least 1.8 MPa.

20. The process of claim 1 wherein said starting solution contains 25% to 35% by weight of said sulfuric acid.

21. The process of claim 1 wherein said phosphorous compounds calculated as phosphorous, are 150 to 600 ppm based on said starting solution.

22. The process of claim 1 wherein said principal amine is selected from the group consisting of cyclic and acyclic aliphatic, aromatic, araliphatic, and heterocyclic primary, secondary, and tertiary amines.

23. The process of claim 22 wherein said principal amine is secondary or tertiary.

24. The process of claim 22 wherein said principal amine is selected from the group consisting of branched or unbranched, aliphatic amines having 10 to 60 carbon atoms.

25. The process of claim 14 wherein said principal amine has 13 to 36 carbon atoms.

26. The process of claim 22 wherein said principal amine is selected from the group consisting of tri-n-hexylamine, tri-n-octylamine, tri-isooctylamines, di-2-ethylhexlamine, triisononylamines, isotridecylamines, diisononyl-2-phenylpropylamine, isononyl-di-2-phenylpropylamine, tri-isotridecylamines, N,N-dimethyl-hexadecylamine, and N,N-dimethyloctadecylamine.

27. The process of claim 26 wherein said principal amine is selected from the group consisting of isotridecyl amines, tri-n-octyl amine, and tri-iso-octyl amines.

* * * * *